(12) United States Patent
Wu et al.

(10) Patent No.: US 11,756,319 B2
(45) Date of Patent: *Sep. 12, 2023

(54) SHIFT INVARIANT LOSS FOR DEEP LEARNING BASED IMAGE SEGMENTATION

(71) Applicant: Verily Life Sciences LLC, South San Francisco, CA (US)

(72) Inventors: Cheng-Hsun Wu, San Bruno, CA (US); Ali Behrooz, San Mateo, CA (US)

(73) Assignee: VERILY LIFE SCIENCES LLC, South San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/454,138

(22) Filed: Nov. 9, 2021

(65) Prior Publication Data

US 2022/0067944 A1 Mar. 3, 2022

Related U.S. Application Data

(63) Continuation of application No. 16/746,340, filed on Jan. 17, 2020, now Pat. No. 11,200,676.

(51) Int. Cl.
*G10L 15/04* (2013.01)
*G06V 20/69* (2022.01)
(Continued)

(52) U.S. Cl.
CPC ............ *G06V 20/695* (2022.01); *G06F 17/15* (2013.01); *G06F 17/18* (2013.01); *G06N 3/08* (2013.01);
(Continued)

(58) Field of Classification Search
CPC . G06T 7/11; G06T 2207/20132; G06F 17/15; G06F 17/18; G06N 3/08;
(Continued)

(56) References Cited

U.S. PATENT DOCUMENTS

2019/0384047 A1 12/2019 Johnson et al.
2021/0103771 A1* 4/2021 Aides ..................... G06K 9/628

FOREIGN PATENT DOCUMENTS

CN 108629266 A 10/2018
CN 109559296 A 4/2019

OTHER PUBLICATIONS

"Convolutional Neural Network", Available online at: https://en.wikipedia.org/w/index.php?title=Convolutional_neural_network&oldid=908472838 , Jul. 29, 2019, 28 pages.
(Continued)

*Primary Examiner* — Charlotte M Baker
(74) *Attorney, Agent, or Firm* — Kilpatrick Townsend & Stockton LLP

(57) ABSTRACT

Systems and methods of improving alignment in dense prediction neural networks are disclosed. A method includes identifying, at a computing system, an input data set and a label data set with one or more first parts of the input data set corresponding to a label. The computing system processes the input data set using a neural network to generate a predicted label data set that identifies one or more second parts of the input data set predicted to correspond to the label. The computing system determines an alignment result using the predicted label data set and the label data set and a transformation of the one or more first parts, including a shift, rotation, scaling, and/or deformation, based on the alignment result. The computing system computes a loss score using the transformation, label data and the predicted label data set and updates the neural network based on the loss score.

21 Claims, 6 Drawing Sheets

(51) Int. Cl.
  *G06T 7/11* (2017.01)
  *G06F 17/15* (2006.01)
  *G06F 17/18* (2006.01)
  *G06N 3/08* (2023.01)
  *G10L 15/16* (2006.01)
  *G06V 10/75* (2022.01)
(52) U.S. Cl.
  CPC .............. *G06T 7/11* (2017.01); *G06V 10/754* (2022.01); *G06V 10/7515* (2022.01); *G10L 15/04* (2013.01); *G10L 15/16* (2013.01); *G06T 2207/20132* (2013.01)
(58) Field of Classification Search
  CPC ..... G10L 15/04; G10L 15/16; G06V 10/7515; G06V 10/754; G06V 20/695
  USPC ........................................................ 382/164
  See application file for complete search history.

(56) References Cited

OTHER PUBLICATIONS

U.S. Appl. No. 16/746,340 , Notice of Allowance, dated Aug. 10, 2021, 9 pages.
Balakrishnan , et al. , "VoxelMorph: A Learning Framework for Deformable Medical Image Registration", IEEE Transactions on Medical Imaging, vol. 38, No. 8 , Aug. 2019 , 16 pages.
Li , et al. , "Semi-Supervised Skin Lesion Segmentation via Transformation Consistent Self-Ensembling Model", Arxiv.Org, Cornell University Library , Aug. 12, 2018, 12 pages.
International Application No. PCT/US2021/013172, International Search Report and Written Opinion, dated May 6, 2021, 12 pages.
Pohl , et al. , "A Unifying Approach to Registration, Segmentation, and Intensity Correction", Medical Image Computing and Computer-Assisted Intervention: MICCAI . . . International Conference on Medical Image Computing and Computer-Assisted Intervention, vol. 8, 2005 , pp. 310-318.
SHALABY , "Shape/Image Registration for Medical Imaging: Novel Algorithms and Applications" , ThinkIR: The University of Louisville's Institutional Repository, Electronic Theses and Dissertations , 2014 , 160 pages.
Shan , et al. , "Unsupervised End-to-end Learning for Deformable Medical Image Registration" , Journal of Latex Class files, vol. 14, No. 8, Available online at https://arxiv.org/pdf/1711.08608.pdf, 2017 , 12 pages.
Subramaniam , et al. , "NCC-Net: Normalized Cross Correlation Based Deep Matcher with Robustness to Illumination Variations", 2018 IEEE Winter Conference on Applications of Computer Vision (WACV), 2018 , 10 pages.
Viola , et al. , "Alignment by Maximization of Mutual Information", International Journal of Computer Vision, vol. 24, No. 2, 1997, pp. 137-154.
Wang , et al. , "Simultaneous Registration and Segmentation of Anatomical Structures from Brain MRI" , Medical Image Computing and Computer-Assisted Intervention, vol. 8, 2005 , pp. 17-25.
Zhao , et al. , "Data Augmentation Using Learned Transformations for One-Shot Medical Image Segmentation", 2019 IEEE/CVF Conference on Computer Vision and Pattern Recognition (CVPR) , Jun. 15, 2019 , 11 pages.
CN202180009741.4 , "Notice of Decision to Grant", dated Jan. 20, 2023, 8 pages.

\* cited by examiner

SHIFT INVARIANT LOSS FOR DEEP LEARNING BASED IMAGE SEGMENTATION

CROSS-REFERENCES TO RELATED APPLICATIONS

This application is a continuation of U.S. patent application Ser. No. 16/746,340, filed Jan. 17, 2020 entitled "Shift Invariant Loss for Deep Learning Based Image Segmentation," the entirety of which is hereby incorporated by reference.

BACKGROUND

Various machine-learning tasks can include feature detection. Feature detection tasks can include image segmentation, language processing of an audio file, or spectral analysis of a waveform. For example, with respect to image analysis, image segmentation can include feature detection, which can include detecting edges of an object in the image. The edges can be used to identify an object in the image. However, during training, the accuracy of the convolutional neural network may be significantly affected by alignment between input images and labeled images. Misalignment can be due to differences between the input and labels, errors in labeling, etc. In some cases, misalignment can be solved by manual adjustment of input images and/or label images. This may be time consuming with even a small number of training examples, and many uses of convolutional neural networks are used to process a large number of images. Some techniques may rely on a separate neural network to align input and labels. However, this can be intensive and require a second training process to train the alignment network. These and other needs are addressed.

BRIEF SUMMARY

One embodiment includes a method comprising identifying, at a computing system, an input data set and identifying, at the computing system, a label data set that identifies one or more first parts of the input data set that correspond to a particular label. The method also includes processing, by the computing system, the input data set using a neural network to generate predicted label data set that identifies one or more second parts of the input data set predicted to correspond to the particular label and determining, by the computing system, an alignment result using the predicted label data set and the label data set. The method also includes determining, by the computing system and based on the alignment result, a transformation that results in a shift, rotation, scaling, and/or deformation of the one or more first parts of the input data set relative to the one or more second parts of the input data set. The method also includes computing, by the computing system, a loss score using the transformation, label data and the predicted label data set and updating, by the computing system, the neural network based on the loss score.

Another embodiment includes a system comprising one or more processors and a computer-readable medium storing a plurality of instructions that when executed cause the one or more processors to identify an input data set and identify a label data set that identifies one or more first parts of the input data set that correspond to a particular label. The processors may also process the input data set using a neural network to generate predicted label data set that identifies one or more second parts of the input data set predicted to correspond to the particular label and determine an alignment result using the predicted label data set and the label data set. The processors may also determine, based on the alignment result, a transformation that results in a shift, rotation, scaling, and/or deformation of the one or more first parts of the input data set relative to the one or more second parts of the input data set. The processors may also compute a loss score using the transformation, label data and the predicted label data set and update the neural network based on the loss score.

Another embodiment includes a non-transitory computer-readable medium storing a plurality of instructions that when executed by one or more processors perform a method comprising identifying an input data set and identifying a label data set that identifies one or more first parts of the input data set that correspond to a particular label. The method also includes processing the input data set using a neural network to generate predicted label data set that identifies one or more second parts of the input data set predicted to correspond to the particular label and determining an alignment result using the predicted label data set and the label data set. The method also includes determining, based on the alignment result, a transformation that results in a shift, rotation, scaling, and/or deformation of the one or more first parts of the input data set relative to the one or more second parts of the input data set, computing a loss score using the transformation, label data and the predicted label data set, and updating the neural network based on the loss score.

These as well as other aspects, advantages, and alternatives, will become apparent to those of ordinary skill in the art by reading the following detailed description, with reference where appropriate to the accompanying drawings.

DETAILED DESCRIPTION

Figure 1:
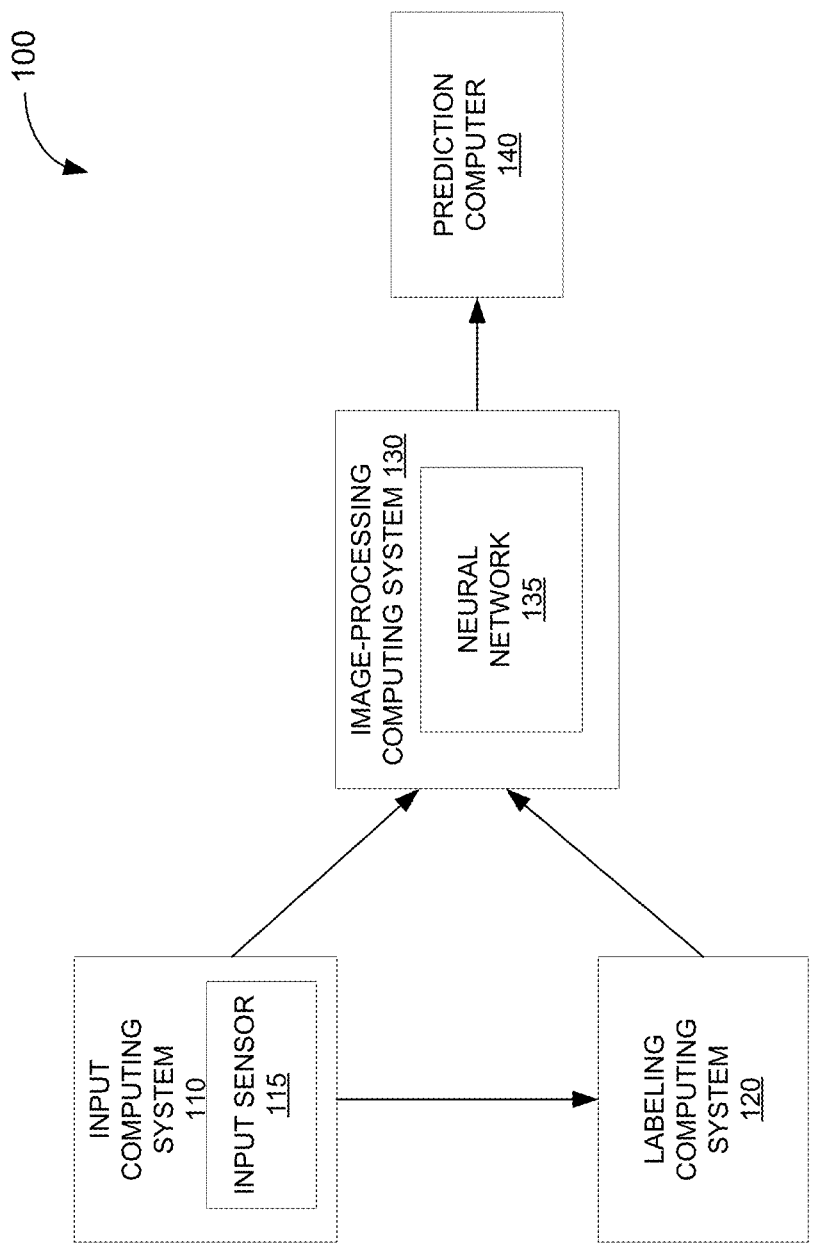
FIG. 1 shows a diagram of a system according to some embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Some embodiments provide systems and methods of aligning features and labels for dense prediction neural networks such as an image segmentation network. In a conventional system, images are input into a neural network (e.g., a segmentation network) to output a predicted label for the image. The predicted label may, for example, identify elements visible in the image. The predicted label, or a set of predicted labels, can be compared to a labeled image, or a set of labeled images, using a loss function. Based on the loss function, the neural network can be adjusted to learn to reduce or minimize the difference between the predicted label and the ground truth label. However, the accuracy of a model trained in such a way may be dependent on the alignment between the input and the labels. For example, some images may be shifted or rotated from the corresponding label images. Thus an image that is correctly predicted may appear to be inaccurate as a result of alignment error, and the model may have persistent low accuracy.

Some proposed solutions include manually identifying, for each image in a training set, an alignment and/or manually detecting misaligned input data and output features/labels. However, this is a time consuming process, especially with datasets containing thousands or millions of training examples. Some solutions include training a separate model that can align labels and features. While this may be more efficient than manually labeling, this still requires the separate development and training of a model.

Some embodiments provide a more efficient and effective way of detecting and correct for misalignment when training a machine-learning model. More specifically, during training, an input image can be fed to a neural network (e.g., a convolutional neural network). The input image can include a patch of an image. The neural network can generate a predicted label data set. The predicted label data set can include (for example) one or more labels and, for each of the one or more labels, position data (e.g., identification of one or more pixels) that correspond to the label. The predicted label data can alternatively or additionally a predicted label image that includes, for each of a set of pixels in the input image, an identification of a label (if any) associated with the pixel.

The predicted label image can be compared to a true labeled image. The comparison can include aligning the predicted and true labeled images and then comparing the labels. In some instances, the true labeled image may be cropped and padded (e.g., with a constant value) back to the original size. A similarity measure can be computed using the predicted label image and the true label image. The similarity measure can indicate if the true label image and predicted label image are misaligned, and if so, by how much. The similarity measure can be computed using a cross-correlation, mutual-information technique, or entropy-based technique. For example, the similarity measure can identify, for each of a set of potential transformations of the predicted label image relative to the actual label image, a quality metric and/or loss. A transformation can be selected that corresponds to a maximum quality metric amongst the set of potential transformations and/or a minimum loss amongst the set of potential transformations.

For example, a maximum value of a cross-correlation may be associated with a transposition of the predicted label image by 10 pixels to the left. The predicted label image may then be shifted 10 pixels to the left (or the true label image can be shifted 10 pixels to the right) before calculating a loss. As another example, a technique based on mutual information (as defined based on Viola, Wells III, "Alignment by Maximization of Mutual Information" International Journal of Computer Vision, 24(2) pg 137-154, 1997, which is hereby incorporated by reference in its entirety for all purposes) can be used to determine that a maximum of mutual information corresponds to a transformation of a 5-degree counterclockwise rotation of the true label image relative to the predicted label image. The true label image can then be rotated by 5 degrees counter-clockwise (of the predicted label image can be rotated by 5 degrees clockwise).

The loss (e.g., L1 loss and/or L2 loss) can then be calculated between the predicted labels and the transformed true labels (or the transformed predicted labels and the true labels), instead of between the predicted labels and the labels. The result of this loss function can then be used to adjust the neural network weights for a next iteration of training. Thus, with each iteration, the alignment can be adjusted in a way that optimizes the neural network loss as well. Some embodiments can use additional neural networks to identify more complex warping transformations.

FIG. 1 shows a block diagram of a system 100 according to some embodiments. System 100 may include an input computer 110, a labeling computer 120, an image-processing computing system 130, and a prediction computer 140. Each of the devices in system 100 may be in communication with one or more other devices in system 100 via a suitable communication network (e.g., the Internet, wide-area network or local-area network). In some embodiments, one or more of the computers or computing systems in system 100 may be the same device and/or included in a same computing system.

The communication network may take a variety of forms, including for example, a cellular telephone network, a land-line telephone network, a packet-switched network such as the Internet, and/or a combination of such networks. Other examples are possible as well. The communication network may be configured for performing various operations, including (for example) facilitating communication between the input computing system 110, labeling computing system 120, image-processing computing system 130, and prediction computing system 140 using one or more protocols. For illustrative purposes, the communication network is depicted in FIG. 1 as a single communication network through which the input computing system 110, labeling computing system 120, image-processing computing system 130, and prediction computing system 140 may communicate. Each of input computing system 110, labeling computing system 120, image-processing computing system 130 and/or prediction computing system 140 can include one or more servers, one or more processors and/or one or more computers and/or each of input computing system 110, labeling computing system 120, image-processing computing system 130 and/or prediction computing system 140 can included within a computing system that includes one or more servers, one or more processors and/or one or more servers. Each of input computing system 110, labeling computing system 120, image-processing computing system and/or prediction computer system can include one or more memories and/or one or more computer-readable media configured to store instructions that, when executed by one or more processors, cause performance of one or more actions disclosed herein. Notably however, the communication network may include two or more separate communication networks, each configured for facilitating communication between select systems or devices.

Input computing system 110 may generate or receive input data sets. Input computing system 110 may comprise or be in communication with an input sensor 115. Examples of an input sensor 115 may include a camera (e.g., connected to a microscope), a microphone, a spectrometer, or some other sensor capable of recording data. In some embodiments, input sensor 115 may be internal to input computing system 110 and record internal data such as CPU usage. Input computing system 110 may be, may include or may be a component within a digital-pathology system. In some embodiments, input computing system 110 may receive input data from other sources, such as by scraping websites for images, downloading sensor data from government databases (e.g., an NIH database) and/or receiving image and/or label data from a client or user device. Input computing system 110 may store the input data for later retrieval.

It will be appreciated that input data sets may be collected at one or more times and/or from one or more sources. For example, a first input data set (e.g., that is associated with corresponding label data) may be collected via input sensor 115 and/or from a government database at a first time, and a second input data set (e.g., that is not associated with true label data) may be collected from a client device at a later second time. In some instances, each input data set includes a set of digital images.

Input computing system 110 may also pre-process the data by, for example, normalizing data, removing noise, and standardizing data size. Pre-processing may also include diving the input data set into training, testing, and validation sets, dividing the input data set into batches, and dividing individual images into patches (e.g., a cropped version of an image). Input computing system 110 can send input data sets to labeling computing system 120 for labeling and to image-processing computing system 130 for processing (e.g., by neural network 635). For example, input computing system 110 may implement a rule that indicates that any image greater than a threshold size (e.g., in terms of dimensions or number of pixels or voxels) is to be divided into patches (e.g., a predefined number of patches, patches of a given size and/or patches having an overlap of a predetermined amount).

Labeling computing system 120 may identify labels for at least some input data in an input data set. Labels generated by labeling computing system 120 may be dense labels, so that every part of the data has a label (e.g., every pixel in an image of a cat is labeled as being part of the cat or not part of the cat). In some embodiments, labeling computing system 120 may have I/O devices for presenting input data to an operator and receiving labels input by the operator. For example, labeling computing system 120 can display an image and a human operator can type in or select an appropriate label for the image. In some embodiments, labeling computing system 120 may determine labels automatically. In some embodiments, labeling computing system 120 may determine labels by receiving the labels from a source (e.g., a government database). Labeling computing system 120 can receive the input data to be labeled from input computing system 110. Labeling computing system 120 can send label data sets to image-processing computing system 130 for processing (e.g., by neural network 135). In some embodiments, labeling computing system 120 may send both the label data set and the input data set.

Image-processing computing system 130 can use one or more input data sets and corresponding labels to train a neural network 135. The neural network can include a convolutional neural network and/or dense neural network. Some input data and corresponding labels may be used for validation and/or testing. Some input data (e.g., that is not associated with labels) can be processed by the (e.g., trained) neural network, which can generate predicted labels. The labels may identify (for each of one or more types of objects or structures, which pixels within individual input images are known or predicted to be associated with the object or structure type. In some instances, the labels can further identify individual instances of a given object or structure type. For example, labels may identify a first set of pixels that are predicted to be associated with a first blood vessel and a second set of pixels that are predicted as being associated with a different second blood vessel.

Image-processing computing system 130 may generate dense predictions such as segmentation to determine the boundaries of things in an image, where a feature is in a spectra, or identifying words in an audio recording. Image-processing computing system 130 can include code for associating input data with the corresponding label, computing alignment results, determining transformations for label data, computing loss scores, and updating the neural network. In some embodiments, image-processing computing system 130 may comprise more than one neural networks (e.g., a neural network and a warping neural network). The warping neural network may be trained to identify a warping or deformation of a predicted label image or a true label image (which can include corresponding patches) that is predicted to align the images, and the neural network can be trained with the warped (predicted or true) image and the other (true or predicted) image to learn how to predict label data based on input images.

Prediction computing system 140 may analyze output from neural-network computing system 130 to generate predictions. For example, neural-network computing system 130 can train a system to identify sections of a cell image that will be stained, then generate staining predictions for new cell images. Prediction computing system 140 can then analyze the staining predictions to evaluate the health of the tissue where the cells originated.

Figure 2:
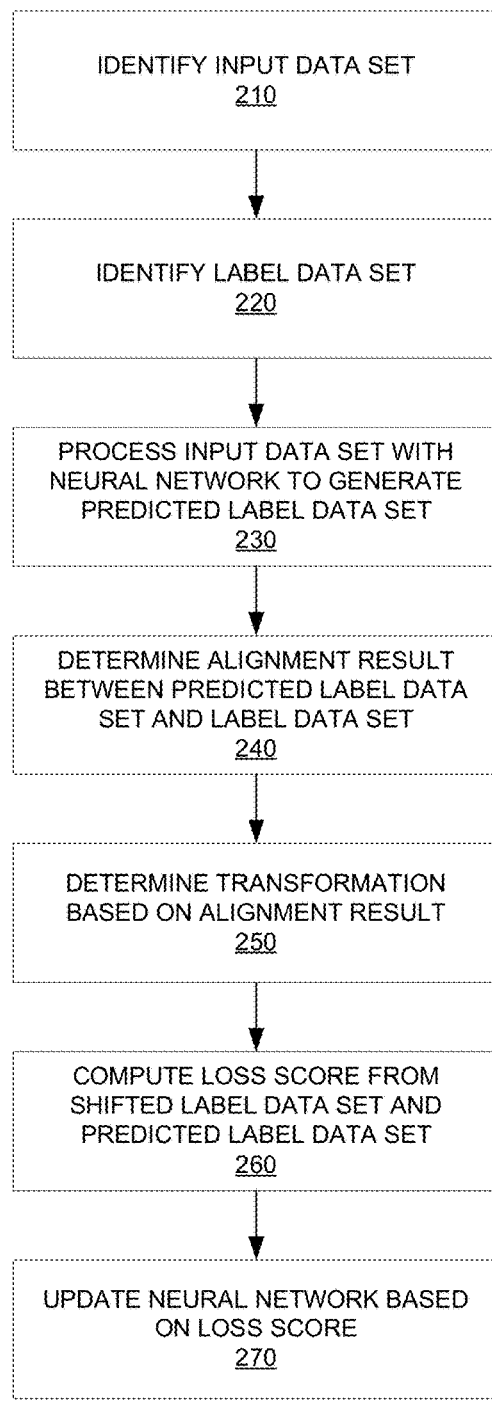
FIG. 2 is a flow diagram of a method according to some embodiments.

FIG. 2 shows a flowchart of a method of aligning features and labels according to some embodiments. The method may be executed by a computing system comprising one or more computers.

At block 210, the computing system can identify an input data set. The input data set may include a data (e.g., an image, spectrum, or audio file) that is to be used to train a neural network to predict labels. In some embodiments, the computing system may receive the input dataset, such as from an input computing system. In some embodiments, the input data set may be stored in memory of the computing system and the computing system may retrieve the input data set from memory. The computing system can also pre-process the input data set, for example, by filtering, normalizing, cropping or re-sampling the data. As one example, the computing system can receive an image. The computing system can then pre-process the image by parsing it into a set of patches that make up the input data set. As another example, the computing system can receive an audio recording. The computing system can then pre-process the audio recording by parsing it into a set of clips that make up the input data set. In some embodiments, the input data set may be processed before it is identified (e.g., by the input computing system).

At block 220, the computing system can identify a label data set. The label data set may identify one or more first parts of the input data set that correspond to a particular label. The labels in the label data set may be referred to as ground truth labels. For example, the label data set may comprise an image (divided into smaller patches) with each pixel in the image labeled as being part of a particular feature or not. Each pixel associated with the feature may be part of the one or more first parts. As another example, a label data set based on a spectrum may include each wavelength labeled as part of a particular feature or not. In some embodiments, the computing system may receive the label dataset. In other embodiments, the label data set may be stored in memory of the computing system and the computing system may retrieve the label data set from memory.

At block 230, the computing system can process the input data set with a neural network to generate a predicted label data set. The predicted label data set may identify one or more second parts of the input data set (e.g., one or more pixels) that are predicted to correspond to a particular label. Agreement between the one or more second parts identified by the neural network and the one or more first parts in the label data set can indicate accurate predictions. The neural network may be a classification neural network such as a convolutional neural network. In some embodiments, the neural network may be a segmentation network configured to identify features in input data. Processing the input data set with the neural network can comprise inputting the input data set into the neural network. At each layer of the neural network, a function of features of the input data can be computed (e.g., averaging pixel values in an input image). An activation function can then be computed with the results of the last layer to determine a probability of each potential label. The predicted labels may be locations. For example, a predicted label of an image may include the predicted pixel locations of a particular feature. In some embodiments, the computing system can process a subset of the input data set (e.g., a batch or mini-batch). In some embodiments, the computing system can process part of each element in the input data set (e.g., a patch of an image). For example, a patch may be 100×100 pixels. In some embodiments, the predicted label may be smaller than the associated input data. For example, a predicted label patch may be a cropped version of an input image. The predicted label may be padded to the size of the associated input data with one or more average values (e.g., the mean intensity of pixels in a patch), forming a padded prediction label data set.

At block 240, the computing system can determine an alignment result between the predicted label data set and the label data set. In some embodiments, an alignment result may be computed for each predicted label in the predicted label data set. The alignment result may be computed with the padded predicted label data set. The alignment result can indicate the difference between the predicted label generated by the neural network for input data and the label in the label data set associated with the input data. In some embodiments, determining the alignment result may be performed with a cross-correlation technique. The output of the cross-correlation indicates where there is the greatest alignment between the predicted label and the label. In other embodiments, determining the alignment result may be performed with a mutual-information technique, or by computing a construction loss (e.g., L1 loss, L2 loss). As an example, the alignment result may indicate the amount of overlap between the pixels associated with the label and the pixels associated with the predicted label. The alignment result may indicate that the label data set (or a subset of the label data set) is aligned with the predicted label data set (or a subset of the predicted label data set). The predicted label data set and the label data set may thus be co-registered with the alignment result.

At block 250, the computing system can determine a transformation based on the alignment result. Transformations may include shifts, translations, rotations, scaling, shearing, deformations, and combinations of transformations, of the one or more first parts of the input data set (those in the label) relative to the one or more second parts of the input data set (those in the predicted label). For example, the alignment result may indicate that the greatest alignment between the label of an image and the predicted label of the image occurs if the label is shifted to the right by 20 pixels. In some embodiments, the computing system can determine a transformation for the label data set as a whole. In other embodiments, the computing system can determine individual transformations for each label in the label data set or for subsets of the label data set. Some transformations may be no transformation, or an identity transformation, if the alignment result indicates that the label and the predicted label are aligned. The computing system can then use the transformation to transform the label data set to form a shifted label data set. In some embodiments, a transformation can be applied to the entire label data set. Alternatively, transformations may be applied to individual labels or groups of labels.

At block 260, a loss score can be computed with the shifted label data set and the predicted label data set. The loss may be a reconstruction loss, and may be computed with a loss function such as L1 or L2. The loss score can indicate the accuracy of the predictions generated by the neural network. A higher loss score may indicate less accurate predictions, and a lower loss score may indicate more accurate predictions. Computing the loss score with the shifted label data set may result in a lower loss score than computing the loss score with the label data set. As the shifted labels have been transformed to increase the alignment with the predicted labels, the loss score may be smaller reflecting the increased alignment.

At block 270, the computing system can update the neural network based on the loss score. For example, the loss score can be used to update weights of the neural network by gradient descent. Blocks 230 to 270 can then be repeated with the updated neural network, further aligning the label data set. The actions of processing the data, determining an alignment result, determining a transformation, computing a loss score, and updating the neural network can be repeated until the loss score converges and/or until the loss score is below a threshold.

Thus, it will be appreciated that, in some instances, not aligning the labels may result in higher loss scores. Thus, training of the neural network may be sub-optimal, as the mis-alignment may introduce penalties that are a result of alignment issues and not label-prediction issues. By aligning the patches first, the calculated loss may more specifically relate to the label-prediction performance of the model. Thus, parameters can be trained to more specifically improve this type of prediction.

Figure 3:
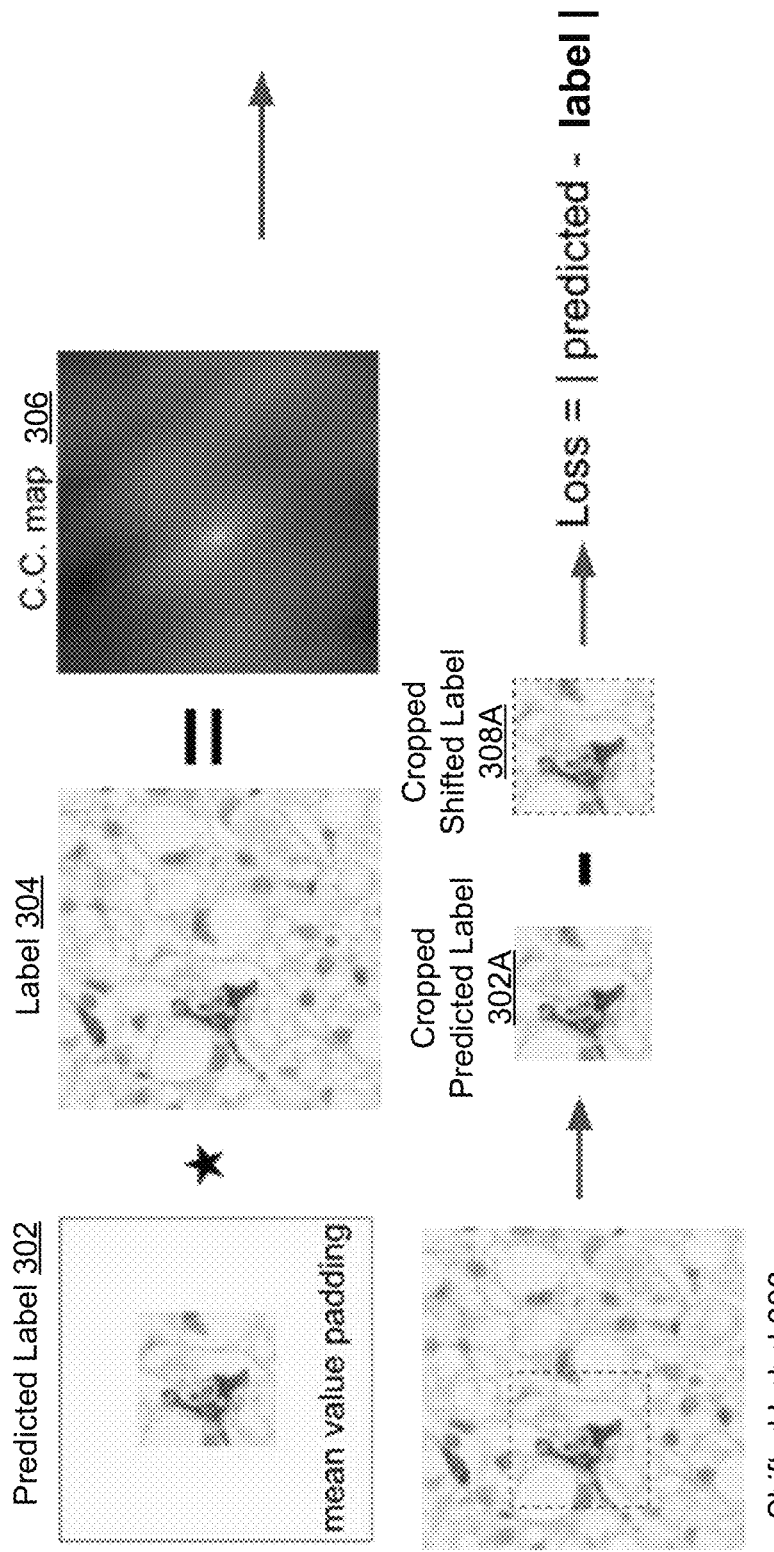
FIG. 3 illustrates example images for a method according to some embodiments.

FIG. 3 shows an example of determining an alignment result and shifting label data. The input data set may be microscopic images of cells.

Predicted label 302 may be an image of cells labeled with a particular staining feature. The predicted label 302 may have been generated by cropping an initial larger predicted-label image to a predefined size and/or by a predefined amount and then padding the cropped image (e.g., with pixels having an intensity set to a particular predefined value, a mean or median value of the pixels that were excluded by the cropping and/or a mean or median value of the pixels that remained after the cropping) to the original size. An alignment result, such as cross correlation (C.C.) map 306, can be computed with predicted label 302 and label 304. The label 304 may be a ground-truth label (e.g., as identified based on input from an expert annotator). Cross correlation map may be computed by determining, for each of a set of pair-wise vertical and horizontal displacements (or other various transformations) a correlation value of predicted label 302 transformed with the displacement and label 304. Thus, C.C. map 306 can include (for example) a first dimension representing potential horizontal shifts, a second dimension representing potential vertical shifts and values representing a strength of correlations between predicted label 302 with the shifts accordingly implemented and label 304. Thus, high values may indicate that corresponding shifts are associated with stronger alignment predictions as compared to low values.

The alignment result can be used to transform the label 304 and generate shifted label 308. For example, the maximum value in the cross correlation map 306 can be used to determine where to crop the label 304 to generate a label that is aligned with the predicted label 302. A loss score can then be computed with a cropped predicted label 302A and a cropped shifted label 308A. This loss score can then be used to update the neural network that generated the predicted label, for example, by gradient descent.

Figure 4:
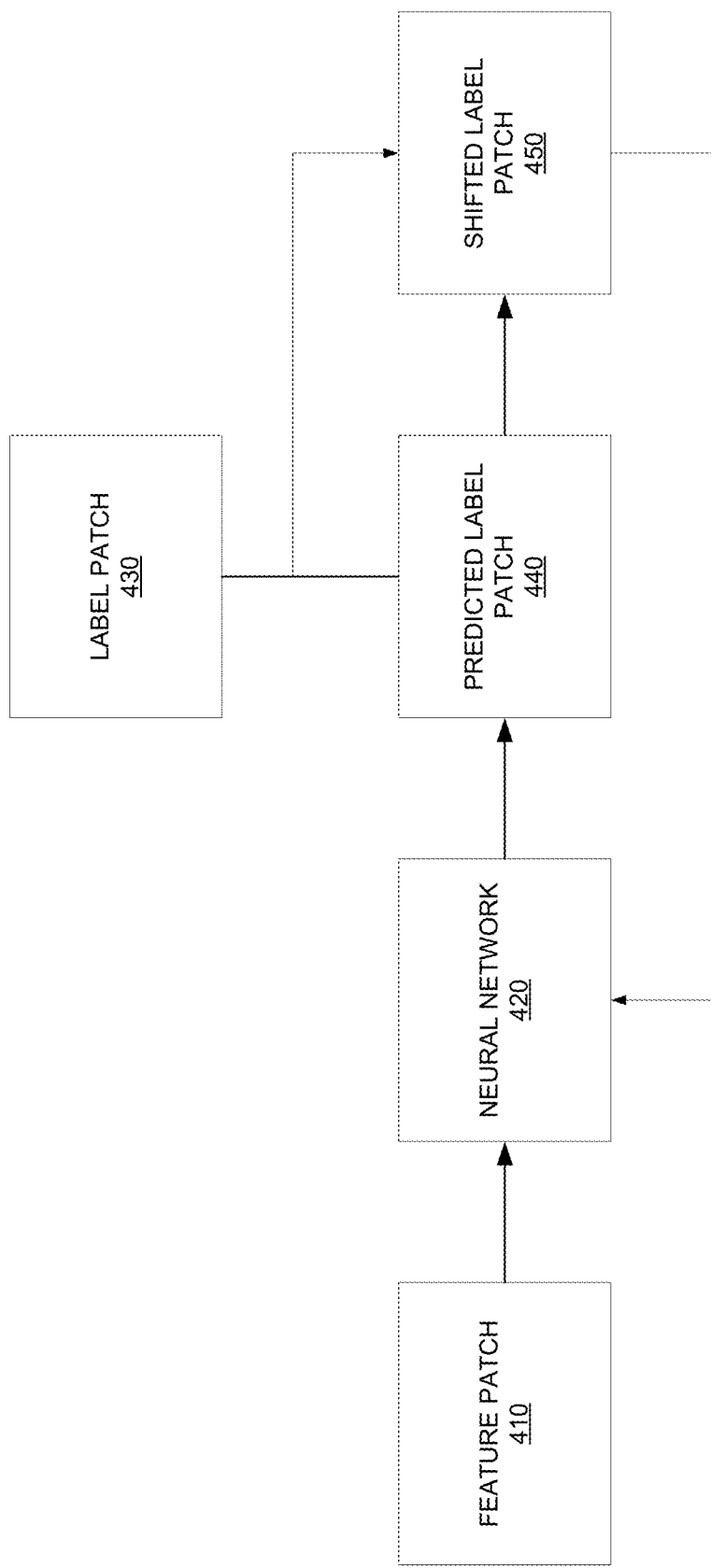
FIG. 4 is a flow chart of a method according to some embodiments.

FIG. 4 shows a training flow diagram of an alignment process.

A feature patch 410, which may be one element of an input data set, may be input into a neural network 420. The feature patch 410 may be an image, an audio file, etc. In some embodiments, the feature patch 410 may be a smaller version of an input data element. The feature patch 410 may be an image, a patch of an image, a clip of an audio recording, or some other piece of data. The feature patch may be pre-processed, such as being filtered or normalized. The feature patch 410 may be part of a subset of the input data set (e.g., a batch, a mini-batch) that is input into the neural network 420 at one time.

The feature patch 410 may be associated with a label patch 430. The label patch 430 can be the essentially the feature patch 410 but with each of some or all elements (e.g., pixels) of the feature patch 410 being associated with a label. For example, in an image that depicts, in part, a cat, each pixel in the label patch may be labeled as being part of the or not part of the cat. The label patch 430 can comprise one or more first parts (e.g., pixels) of the input data set. The feature patch 410 may be an image, a patch of an image, a clip of an audio recording, or some other piece of data. The label patch 430 may be referred to as a ground truth label. The label may be applied by a person labeling data, or may be generated based on the input data (e.g., based on the source).

The neural network 420 may be a convolutional neural network, such as a segmentation network. The neural network can be configured for segmentation (e.g., identifying the boundaries of a feature in an image) or some other dense prediction task. A dense prediction task is a task where there is a prediction for each element of the input. As one example, predicting whether or not each pixel of an image is part of an object, as in segmentation, is a dense prediction task. In some embodiments, the neural network may 420 may be a convolutional neural network. Suitable neural networks may include U-Net, a convolutional neural network that includes up-sampling operators, in addition to down-sampling operators, to increase output resolution.

The neural network 420 can output a predicted label patch 440, where each element of the predicted label patch (e.g., each pixel) is associated with a particular label. The predicted label patch may include one or more second parts (e.g., one or more pixels) of the input data set that are associated with a particular label. For example, each pixel can be labeled as being part of an object in the image or not part of the object. In some embodiments, the predicted label patch 440 may be smaller than the feature patch 410. For example, the feature patch 410 may be 256×256 pixels while the predicted label patch 440 is only 100×100 pixels. The predicted label patch 440 may be padded to the size of the feature patch 410 with one or more average values. For example, 78 pixels may be added to each side of the predicted label patch 440, each pixel comprising the average intensity value of the predicted label patch 440, to make a padded predicted label patch that is 256×256 pixels. In other embodiments, other values may be used for padding, such as a predetermined constant, a minimum value, or a null value.

An alignment result can then be computed between the predicted label patch 440 and the label patch 430. In some embodiments, the alignment result can be determined by a cross correlation technique. With a cross correlation technique, a cross correlation can be computed between the predicted label patch 440 and the label patch 430 to generate a map, with each element (e.g., pixel) of the map indicating the result of the cross correlation. A greater result in a location on the map may indicate more alignment between the predicted label patch 440 and the label patch 430. In other embodiments, the alignment result can be determined by a mutual information technique, or with a loss function (e.g., L1 loss, L2 loss). A transformation, such as shifting, scaling, rotating, and/or otherwise deforming the label patch 430, can be generated based on the alignment result. The transformation can be a single function applied to the label patch 430. In some embodiments, the transformation can resize the label patch 430 to the same size as the unpadded predicted label patch in a way that increases alignment. For example, if the alignment result (e.g., a cross correlation map) indicates that there is the greatest alignment between a 100×100 pixel predicted label patch 440 and the top left corner of a 256×256 pixel label patch 430, the transformation may crop the label patch 430 to the 100×100 pixels in the top left corner. In some embodiments, transformations may include scaling, and the label patch 430 may be up-sampled or down-sampled as appropriate.

The transformation can be applied to the label patch 430 to generate a shifted label patch 450. A loss score can then be calculated between the shifted label patch 450 and the predicted label patch 440. For example, an L1 loss or L2 loss score can be calculated. In some embodiments, the loss score can be calculated with the transformation, the label patch 430, and the predicted label patch 440 without generating the shifted label patch. Before being used to calculate the loss score, the padding can be removed from the predicted label patch. This loss score can then be the loss score that is used in backpropagation to update and train the neural network 420. In this way, the neural network 420 can be trained in a way that optimizes both the prediction accuracy of the neural network 420 and the alignment between ground truth labels and associated inputs.

Figure 5:
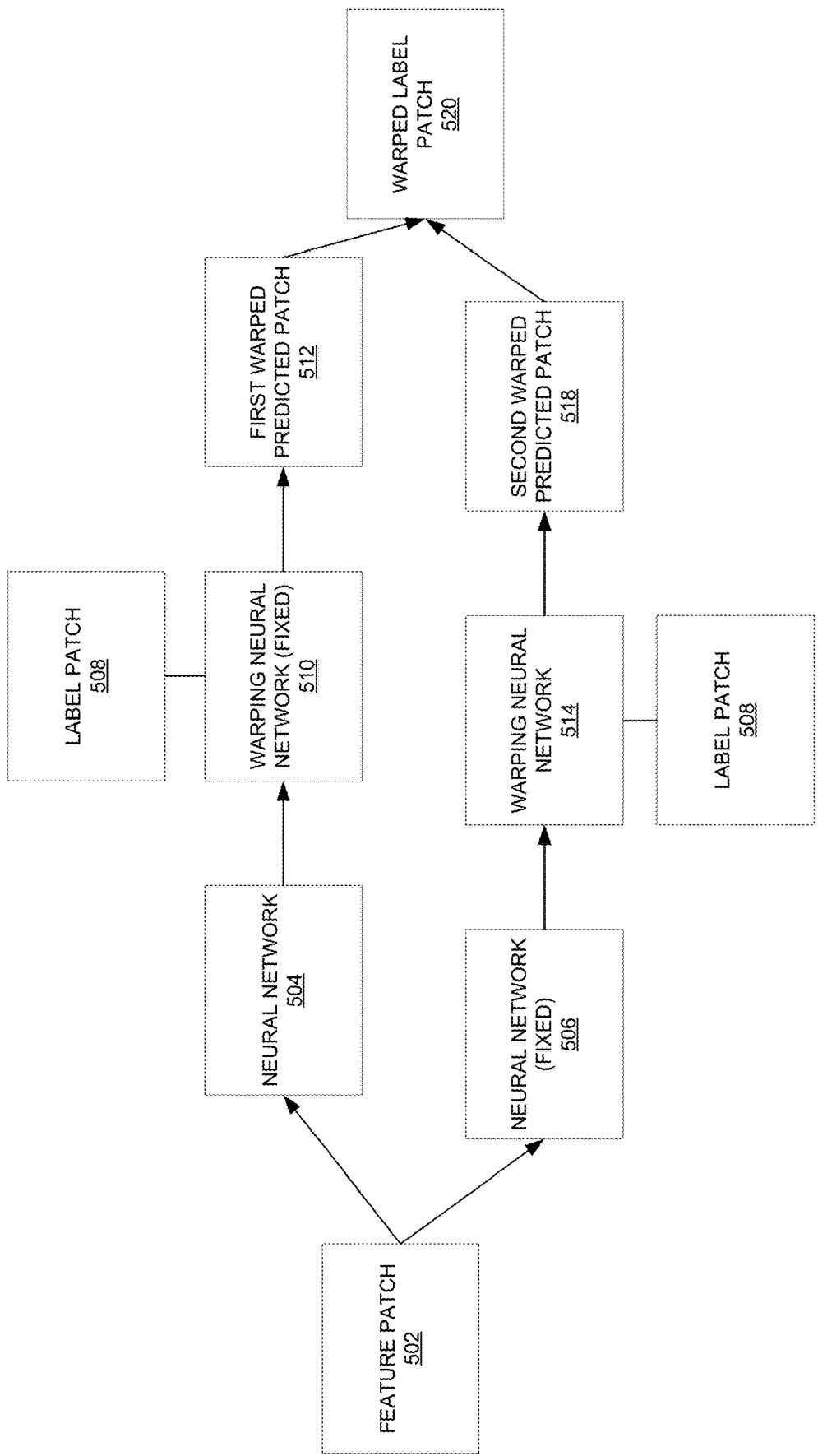
FIG. 5 is a flow chart of another method according to some embodiments.

FIG. 5 shows an alternate training flow of an alignment process. The process of FIG. 5 may allow for more complex transformations beyond simple translations or rotations by adding a warping neural network to the system. The feature patch 502, the associated label patch 508, and the neural network 504 may be similar to feature patch 410, label patch 430, and neural network 420 of FIG. 4.

The feature patch 502 can be input into a neural network 504 and a fixed neural network 506. The output of the neural network 504 can be input into a fixed warping neural network 510. The warping neural network 510 can determine a warping transformation for the output of the neural network 504, first warped predicted patch 512.

The feature patch 502 can also be input into the fixed neural network 506. The fixed neural network 506 may be neural network 504 with some elements fixed. The output of fixed neural network 506 may be input into a warping neural network 514. Fixed warping neural network 510 may be warping neural network 514 with some elements fixed. The output of warping neural network 514 may be second warped predicted patch 518. Label patch 508 can then be combined with first warped predicted patch 512 and second warped predicted patch 518 to generate a warped label patch 520. This warped label patch 520 can be used to calculate the loss score and update the neural networks. The warping neural networks may be able to determine any spatial deformation, instead of a simple transformation or combination of transformations.

Figures 6A, 6B:
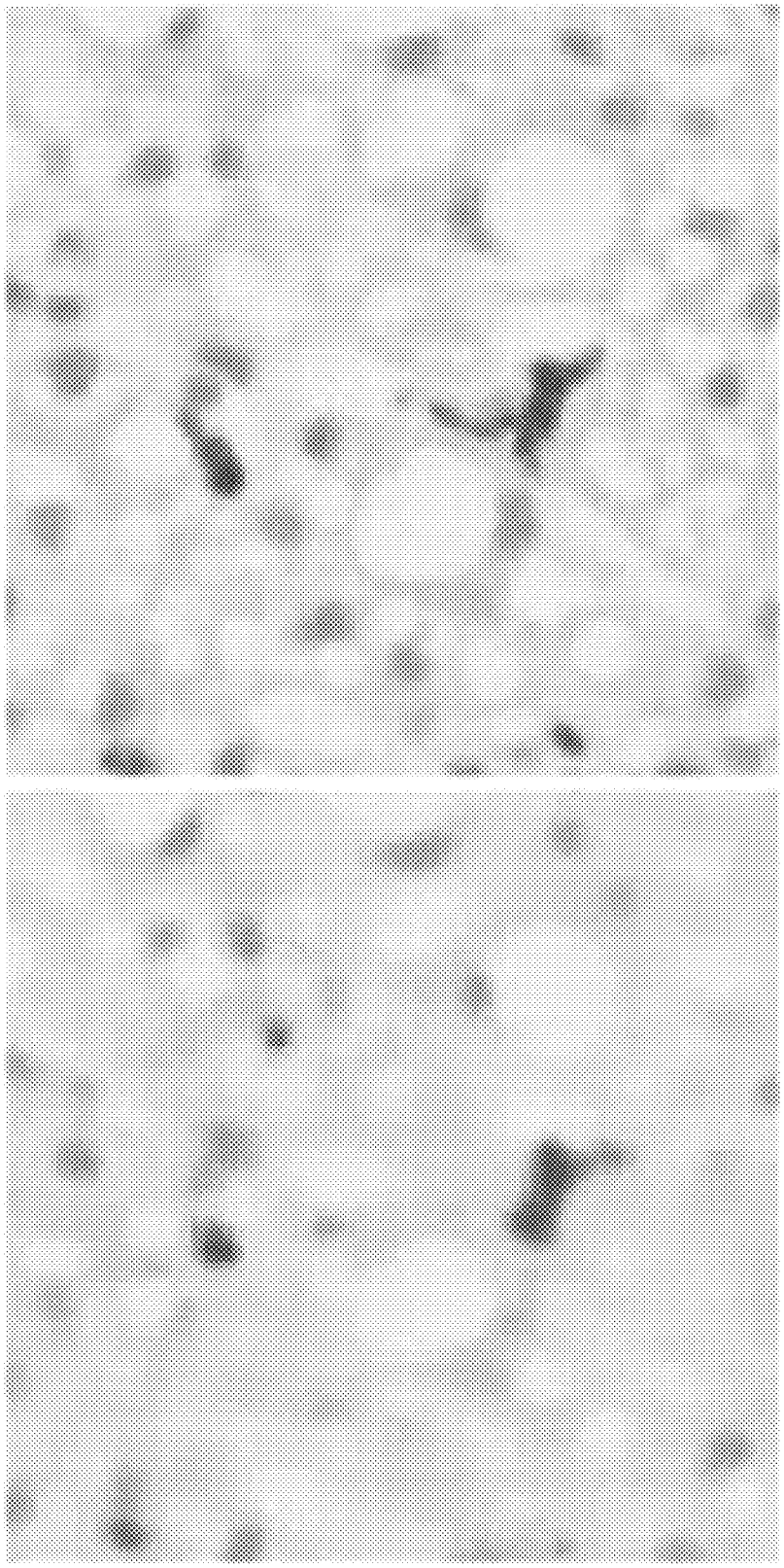
FIG. 6A and FIG. 6B illustrate example results with methods according to some embodiments.

FIG. 6A and FIG. 6B show simulated results of using cross correlation adjusted (C.C.A.) loss in the context of virtual staining. FIG. 6A shows an example staining image generated with a neural network Unet trained without C.C.A. loss. Note that the definition of the image is low and details are difficult to distinguish. FIG. 6B shows an example staining image generated with a neural network Unet trained with C.C.A. loss. Significant improvements in terms of resolution and image quality can be observed in this example.

Disclosed systems and methods provide multiple advantages. By performing patch-based alignment while calculating a loss, training of a neural network that relies on the loss can be improved to produce a more accurate trained neural network. The patch-based alignment can correct and/or reduce local misalignment (at the scale of each training patch) which cannot be easily corrected by global transformations or global alignment techniques.

Further, disclosed embodiments that rely on processing a predicted label image (e.g., predicted label patch) and a true label image (e.g., true label patch) have a benefit of comparing images of the same modality. That is, a label image (e.g., a true label image) need not be compared to an input image, which may involve comparing images of different modalities. The same-modality approach can have an advantage of being less ambiguous and more sensitive to misalignment as compared to approaches that rely on comparing data across different modalities.

Additionally, the quality of segmentation or dense prediction and the quality of alignment can be optimized simultaneously and/or concurrently. This concurrent optimization can result in high consistency between alignment and segmentation or dense prediction because better segmentation or dense prediction yields better alignment and vice versa. For a dense prediction, better optimization of the neural network can result in clearer predictions (e.g., sharper image predictions, cleaner audio predictions).

It will be readily understood that the aspects of the present disclosure, as generally described herein, and illustrated in the figures, can be arranged, substituted, combined, separated, and designed in a wide variety of different configurations, all of which are explicitly contemplated herein. While various aspects and embodiments have been disclosed herein, other aspects and embodiments will be apparent to those skilled in the art.

Example methods and systems are described above. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Reference is made herein to the accompanying figures, which for a part thereof. In the figures, similar symbols typically identify similar components, unless context dictates otherwise. Other embodiments may be utilized, and other changes may be made, without departing from the spirit or scope of the subject matter presented herein. The various aspects and embodiments disclosed herein are for purposes of illustration and are not intended to be limiting, with the true scope and spirit being indicated in the following claims.

What is claimed is:

1. A method comprising:
receiving a first image of an unstained tissue sample;
receiving a second image of the unstained tissue sample;
generating, by a trained neural network, a first set of labels corresponding to first tissue features within the first image, and a second set of labels corresponding to second tissue features within the second image;
determining, by the trained neural network, an alignment result between the first and second images based at least in part on at least one of the first and second sets of labels;
generating, by the trained neural network, an aligned first image on the alignment result; and
applying a virtual stain to the aligned first image.

2. The method of claim 1, wherein the trained neural network was trained by:
identifying an input data set;
identifying a label data set that identifies one or more first parts of the input data set that correspond to a particular label;
processing the input data set using a neural network to generate predicted label data set that identifies one or more second parts of the input data set predicted to correspond to the particular label;
determining an alignment result using the predicted label data set and the label data set;
determining, based on the alignment result, a transformation that results in a shift, rotation, scaling, and/or deformation of the one or more first parts of the input data set relative to the one or more second parts of the input data set;
computing a loss score using the transformation, label data and the predicted label data set; and
updating the neural network based on the loss score to generate the trained neural network.

3. The method of claim 1, wherein generating the aligned first image comprises shifting, rotating, or scaling the first tissue features.

4. The method of claim 1, wherein determining an alignment result comprises determining, using a warping neural network, a warping or deformation of at least one of the first or second images.

5. The method of claim 4, wherein generating the aligned first image comprises warping the first tissue features based on the determined warping or deformation.

6. The method of claim 1, further comprising:
dividing, by the trained neural network, the first image into a plurality of first image patches;
dividing, by the trained neural network, the second image into a plurality of second image patches; and
wherein:
generating the first and second sets of labels is based on the plurality of first image patches and the plurality of second image patches, respectively, and
generating the first and second sets of dense predictions is based on the plurality of first image patches and the plurality of second image patches, respectively.

7. The method of claim 1, further comprising:
generating, by the trained neural network, a first set of dense predictions of third tissue features within the first image and a second set of dense predictions of fourth tissue features within the second image; and
wherein determining the alignment result is further based on the first and second sets of dense predictions.

8. A system comprising:
a non-transitory computer-readable medium; and
one or more processors communicatively coupled to the non-transitory computer-readable medium, the one or more processors configured to execute processor-executable instructions stored in the non-transitory computer-readable medium to:
receive a first image of an unstained tissue sample;
receive a second image of the unstained tissue sample;
generate, by a trained neural network, a first set of labels corresponding to first tissue features within the first image, and a second set of labels corresponding to second tissue features within the second image;
determine, by the trained neural network, an alignment result between the first and second images based at least in part on at least one of the first and second sets of labels;
generate, by the trained neural network, an aligned first image on the alignment result; and
apply a virtual stain to the aligned first image.

9. The system of claim 8, wherein the trained neural network was trained by:
identifying an input data set;
identifying a label data set that identifies one or more first parts of the input data set that correspond to a particular label;
processing the input data set using a neural network to generate predicted label data set that identifies one or more second parts of the input data set predicted to correspond to the particular label;
determining an alignment result using the predicted label data set and the label data set;
determining, based on the alignment result, a transformation that results in a shift, rotation, scaling, and/or deformation of the one or more first parts of the input data set relative to the one or more second parts of the input data set;
computing a loss score using the transformation, label data and the predicted label data set; and
updating the neural network based on the loss score to generate the trained neural network.

10. The system of claim 8, wherein the one or more processors are configured to execute further processor-executable instructions stored in the non-transitory computer-readable medium to generate the aligned first image based on shifting, rotating, or scaling the first tissue features.

11. The system of claim 8, wherein the one or more processors are configured to execute further processor-executable instructions stored in the non-transitory computer-readable medium to determine, using a warping neural network, a warping or deformation of at least one of the first or second images.

12. The system of claim 8, wherein the one or more processors are configured to execute further processor-executable instructions stored in the non-transitory computer-readable medium to generate the aligned first image based on warping the first tissue features based on the determined warping or deformation.

13. The system of claim 8, wherein the one or more processors are configured to execute further processor-executable instructions stored in the non-transitory computer-readable medium to:
divide, by the trained neural network, the first image into a plurality of first image patches;
divide, by the trained neural network, the second image into a plurality of second image patches;
generate the first and second sets of labels based on the plurality of first image patches and the plurality of second image patches, respectively, and
generate the first and second sets of dense predictions based on the plurality of first image patches and the plurality of second image patches, respectively.

14. The system of claim 8, wherein the one or more processors are configured to execute further processor-executable instructions stored in the non-transitory computer-readable medium to:
generate, by the trained neural network, a first set of dense predictions of third tissue features within the first image and a second set of dense predictions of fourth tissue features within the second image; and
determine the alignment result further based on the first and second sets of dense predictions.

15. A non-transitory computer-readable medium comprising processor-executable instructions stored in the non-transitory computer-readable medium configured to cause one or more processors to:
receive a first image of an unstained tissue sample;
receive a second image of the unstained tissue sample;
generate, by a trained neural network, a first set of labels corresponding to first tissue features within the first image, and a second set of labels corresponding to second tissue features within the second image;
determine, by the trained neural network, an alignment result between the first and second images based at least in part on at least one of the first and second sets of labels;
generate, by the trained neural network, an aligned first image on the alignment result; and
apply a virtual stain to the aligned first image.

16. The non-transitory computer-readable medium of claim 15, wherein the trained neural network was trained by:
identifying an input data set;
identifying a label data set that identifies one or more first parts of the input data set that correspond to a particular label;
processing the input data set using a neural network to generate predicted label data set that identifies one or more second parts of the input data set predicted to correspond to the particular label;
determining an alignment result using the predicted label data set and the label data set;
determining, based on the alignment result, a transformation that results in a shift, rotation, scaling, and/or deformation of the one or more first parts of the input data set relative to the one or more second parts of the input data set;
computing a loss score using the transformation, label data and the predicted label data set; and
updating the neural network based on the loss score to generate the trained neural network.

17. The non-transitory computer-readable medium of claim 15, further comprising processor-executable instructions stored in the non-transitory computer-readable medium configured to cause the one or more processors to generate the aligned first image based on shifting, rotating, or scaling the first tissue features.

18. The non-transitory computer-readable medium of claim 15, further comprising processor-executable instructions stored in the non-transitory computer-readable medium configured to cause the one or more processors to:
   determine, using a warping neural network, a warping or deformation of at least one of the first or second images; and
   generate the aligned first image based on warping the first tissue features based on the determined warping or deformation.

19. The non-transitory computer-readable medium of claim 15, further comprising processor-executable instructions stored in the non-transitory computer-readable medium configured to cause the one or more processors to generate the aligned first image based on warping the first tissue features based on the determined warping or deformation.

20. The non-transitory computer-readable medium of claim 15, further comprising processor-executable instructions stored in the non-transitory computer-readable medium configured to cause the one or more processors to:
   divide, by the trained neural network, the first image into a plurality of first image patches;
   divide, by the trained neural network, the second image into a plurality of second image patches;
   generate the first and second sets of labels based on the plurality of first image patches and the plurality of second image patches, respectively, and
   generate the first and second sets of dense predictions based on the plurality of first image patches and the plurality of second image patches, respectively.

21. The non-transitory computer-readable medium of claim 15, further comprising processor-executable instructions stored in the non-transitory computer-readable medium configured to cause the one or more processors to:
   generate, by the trained neural network, a first set of dense predictions of third tissue features within the first image and a second set of dense predictions of fourth tissue features within the second image; and
   determine the alignment result further based on the first and second sets of dense predictions.

* * * * *